Figure 1:
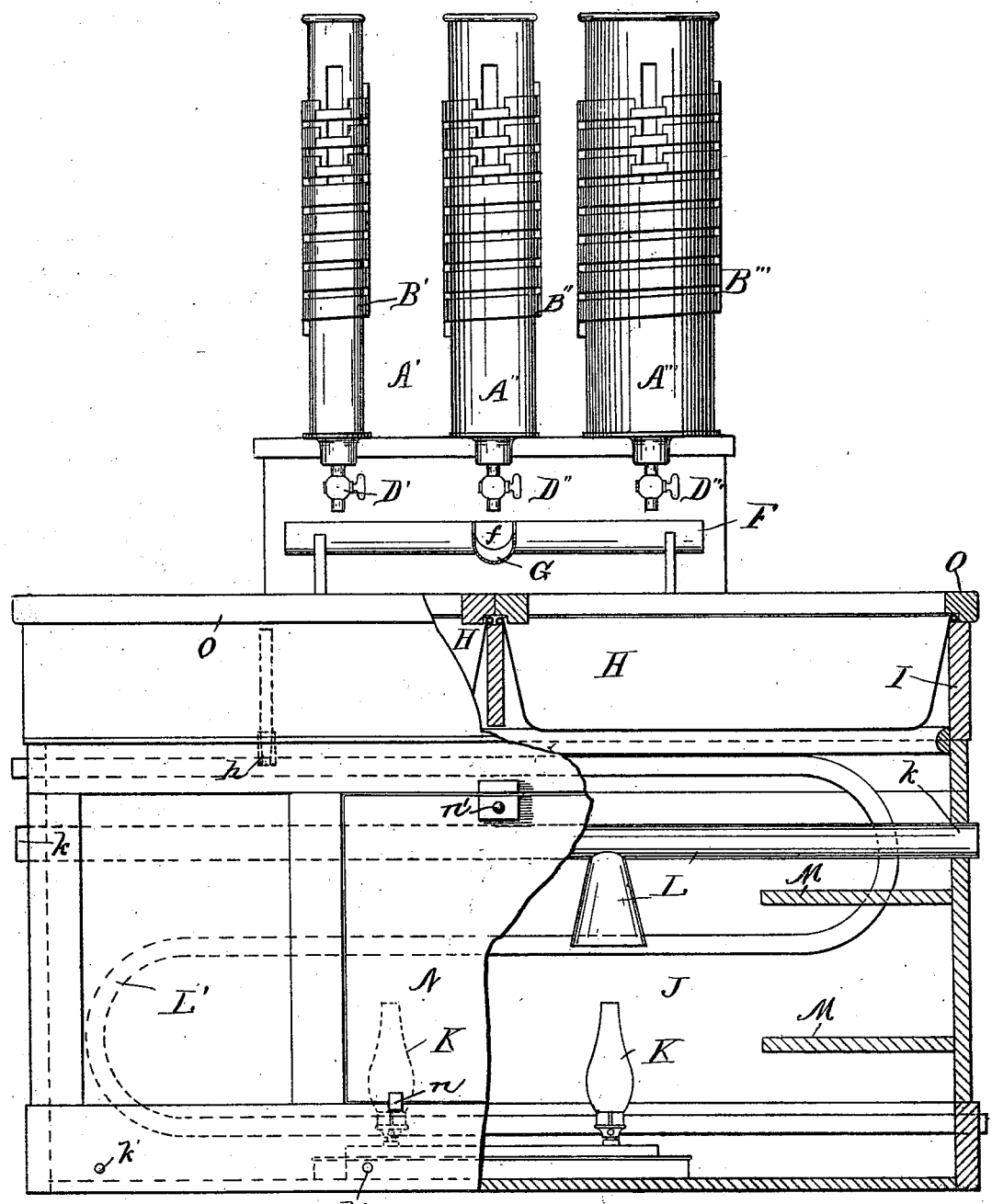

(No Model.) 3 Sheets—Sheet 1.

G. T. McLAUTHLIN.
CREAMERY APPARATUS.

No. 514,021. Patented Feb. 6, 1894.

WITNESSES
A. Kenny
Jas Naylor Jr

INVENTOR.
George Thomas McLauthlin

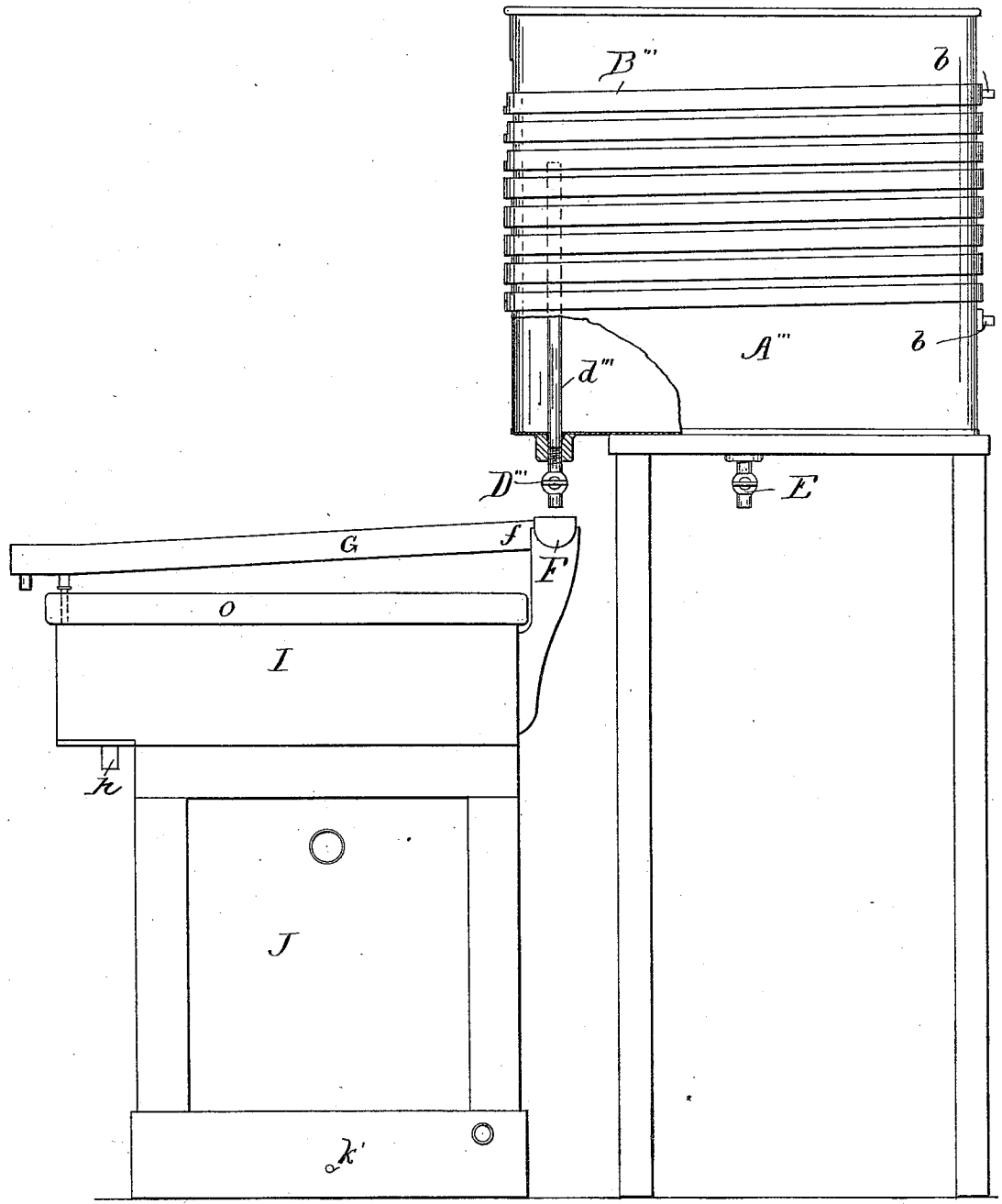

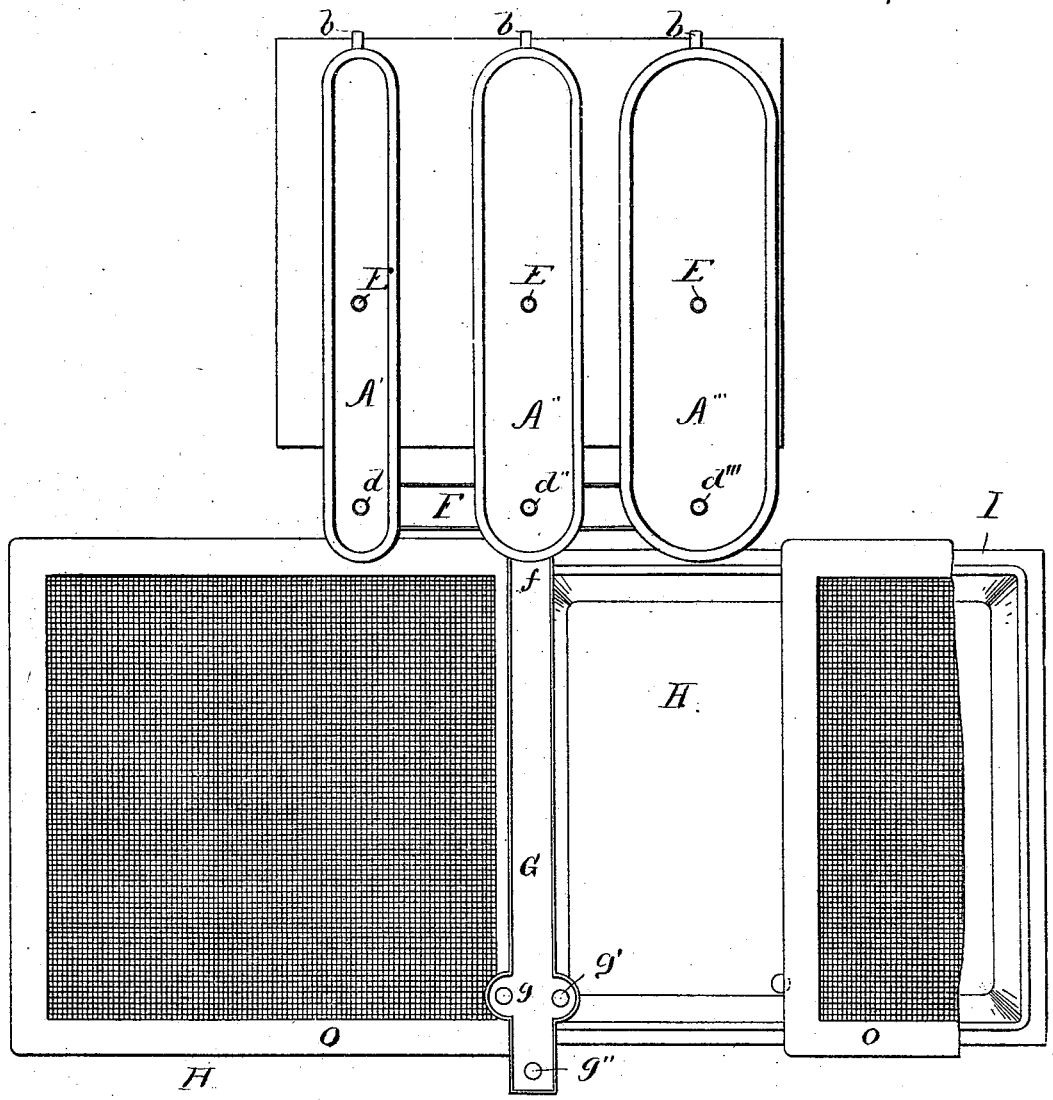

UNITED STATES PATENT OFFICE.

GEORGE THOMAS McLAUTHLIN, OF BOSTON, MASSACHUSETTS.

CREAMERY APPARATUS.

SPECIFICATION forming part of Letters Patent No. 514,021, dated February 6, 1894.

Application filed December 22, 1892. Serial No. 456,002. (No model.)

*To all whom it may concern:*

Be it known that I, GEORGE THOMAS MCLAUTHLIN, a citizen of the United States, and a resident of Boston, in the county of Suffolk and State of Massachusetts, have invented new and useful Improvements in Creamery Apparatus, of which the following, taken in connection with the accompanying drawings, is a specification.

My improvements relate to what is known as the "deep-setting system," in which the fresh milk is poured into deep cans and from which the cream is conducted to another vessel, for ripening, preparatory to churning.

The object of these improvements is to make a complete and portable apparatus that may be used to advantage in small dairies; and it consists in the arrangement and construction as will be hereinafter fully specified and set forth in the claims.

In the drawings:—Figure 1 is a front elevation; Fig. 2 a side elevation; Fig. 3 a plan view with covers removed.

A' A" A''' are the milk cans, of uniform depth, but of different widths, so that each can has a different capacity. They are mounted upon and secured to a frame.

B' B" B''' are conduits, soldered to the cans and are made in tiers or a continuous belt; and having the inlet openings at one end of the conduits and outlets at the other as shown at b b. Suitable connections are made to the inlet and outlet openings, so that a cooling current may be sent through. These conduits are preferably arranged on the middle outer surface of the cans, so that the separated cream and the lower part of the milk, are not subjected to their influence.

Each can at the front end is provided with the ordinary glass to show the cream line within, except that in the present case it must be located at the top instead of the bottom as ordinarily used. The surface on the inside at the bottom of cans is made sloping to the front ends, so as to drain the contents to the stop cocks D' D" D'''. These stop cocks are soldered on to the bottom so as to be flush and smooth inside and have tapered openings from the inside; into which are fitted, the removable tubes d' d" d'''; the lengths of these tubes are such that their upper ends reach nearly to the level of the cream line. These tubes are for drawing off the cream by opening the stop cocks; and also for drawing off the milk by their removal, through the same stop cocks. The cream is thus drawn from the surface of the milk.

The usual practice in deep-setting is to draw the milk first; the cream following after, leaving a thick film of cream all over the inner surface of the cans; which latter objection is avoided by the improvement shown.

Suitable covers are provided for the cans to keep out dust and insects.

To hasten the separation of cream and to remove animal odor, there is an air inlet E into the bottom of each can, and proper connections to any air supply under pressure.

Arranged below the outlet cocks is the trough F having a single outlet at f over and into the trough G below it; which is provided with the openings g g' g" having suitable plugs or stoppers. These troughs are made of tin and all parts made so as to be readily cleaned.

H H are pans for receiving the cream from the cans. They are made shallow, so as to expose a large surface of the pan underneath. These pans are sustained by and fit closely in a frame I which sets tightly upon the cabinet J.

Kerosene or spirit lamps K K are set into the cabinet. Above it is the pipe L and opening, also the openings k k at the outside. Vent openings k' k' through the frame of the cabinet admit air necessary for combustion. This lamp provides for direct heat to the cream by which its temperature is regulated for ripening. It can be easily and cheaply maintained with accuracy. This same lamp may be placed at any convenient position outside the cabinet and its heat given to a rising section of the radiating conduit L' which being filled with water, it circulates through the conduit secured to bottom of pans, and transmits the heat to the cream in the pans above it. The application of heat is for cold weather; in hot weather a cold fluid may be forced through the conduit, or ice may be placed directly into the cabinet.

A number of shelves M M are arranged within the cabinet to serve the convenience of domestic uses.

A removable door N is fitted to the cabinet, being held by the dowels n n and fastening n'.

O O are covers to protect the surface of cream from insects and dust. The covering material is stretched and mounted upon a frame which sets closely down upon the frame of the cabinet.

The pans H H and frame supporting same, extend in front over the cabinet, so that the outlets h h may have a clear drop into the vessels or trough set to receive the cream. These outlets are tapered and have plugs or stoppers with corresponding taper.

The use of this apparatus is as follows:— A quantity of fresh milk is run into the cans A' A'' A'''. If not enough to fill the whole or no more than to fill one, by having the cans of different capacities, it can always be so run as to have filled cans or nearly so. Connections are made to the openings and a flow turned on, which cools the milk in proximity to the conduit and causes it to descend and the warm milk to rise to the surface. The circulation thus created is continued till the cream is all left on the surface of the milk, and the milk reduced to the temperature of the cooling liquid. The admission of pure air under pressure, and at suitable temperature, at the air inlets, aids the cream globules to rise and at the same time takes up all animal odor and carries it off. Cold air may also be forced through the conduit instead of water. The cream is withdrawn by opening the stop cocks; a little milk will flow first which is not allowed to run into the pans H H but is taken at the spout or opening g''; cream soon follows which is turned into either pan through the openings g or g'. When the cream is thus all drawn down to the surface of the milk, the flow will cease. Then by removing the tubes d' d'' d''', the milk may all be withdrawn and conducted to the outlet g''. The proper temperature of the cream in the pans H H is steadily maintained by the artificial heat until it is ripe or in condition for churning.

I am aware that deep-setting cans have been used for raising cream and also that ice and cold water have been used in connection therewith; such I do not claim; but, Having described my invention, what I claim as new, and desire to secure by Letters Patent, is—

1. In a creamery apparatus the combination with the milk cans of different capacity having outlets to a connecting trough, said trough having discharges for cream and a separate discharge for skim milk; of the shallow cream pans as shown and described.

2. The cream pans arranged upon a cabinet, having an extending part of said pans over the front edge of said cabinet, so that the outlets may clear the front of cabinet, in combination with the sliding covers o, o, and the means for providing artificial heat under said pans as shown and described.

3. In a creamery apparatus for ripening cream, the combination with the cream pans having sliding covers o, o, and arranged upon a cabinet, of a coil or lamp and the pipe L arranged within said cabinet as and for the purpose set forth.

4. In a creamery apparatus the combination with connecting troughs having common inlet from the milk cans, a single outlet to each cream pan and an outlet outside the edge of the cabinet; of the deep setting milk cans and the shallow cream pans as shown and described.

5. In a creamery apparatus the combination with the deep setting milk cans supported upon a frame, and the shallow cream pans supported by the cabinet at a lower elevation than the milk cans; of the supported connecting trough provided with an outlet into each pan, and a like outlet over the edge of the cabinet, as herein set forth.

In testimony whereof I have signed my name to this specification, in the presence of two subscribing witnesses, on this 29th day of November, A. D. 1892.

GEORGE THOMAS McLAUTHLIN.

Witnesses:
 A. KENNY,
 M. B. McLAUTHLIN.